United States Patent [19]
Kawamoto

[11] Patent Number: 5,752,844
[45] Date of Patent: May 19, 1998

[54] CABLE TYPE ELECTRIC CONNECTOR

[75] Inventor: Akio Kawamoto, Fuji, Japan

[73] Assignee: Nihon Plast Co., Ltd., Fuji, Japan

[21] Appl. No.: 814,467

[22] Filed: Mar. 10, 1997

Related U.S. Application Data

[62] Division of Ser. No. 429,656, Apr. 27, 1995, Pat. No. 5,630,723.

[30] Foreign Application Priority Data

Nov. 30, 1994 [JP] Japan ................. 6-297515
Dec. 28, 1994 [JP] Japan ................. 6-329072

[51] Int. Cl.$^6$ ................................. H01R 35/04
[52] U.S. Cl. ............................ 439/164; 439/15
[58] Field of Search .................... 439/164, 15

[56] References Cited

U.S. PATENT DOCUMENTS

| | | | |
|---|---|---|---|
| 3,763,455 | 10/1973 | Confer et al. | 339/3 |
| 5,046,951 | 9/1991 | Suzuki | 439/15 |
| 5,137,463 | 8/1992 | Sasaki et al. | 439/164 |
| 5,171,163 | 12/1992 | Kubota et al. | 439/15 |
| 5,219,460 | 6/1993 | Kato et al. | 439/164 |
| 5,224,871 | 7/1993 | Ide et al. | 439/164 |
| 5,277,604 | 1/1994 | Ide et al. | 439/164 |

FOREIGN PATENT DOCUMENTS

| | | | |
|---|---|---|---|
| 4-310445 | 11/1992 | Japan . | |
| 5-13140 | 1/1993 | Japan . | |
| 5-56543 | 3/1993 | Japan . | |
| 5-20763 | 8/1993 | Japan . | |
| 6-275354 | 9/1994 | Japan | 439/164 |

*Primary Examiner*—Gary F. Paumen
*Attorney, Agent, or Firm*—Foley & Lardner

[57] ABSTRACT

A cable type electric connector comprises an annular casing having a cylindrical wall; an annular rotor with a concentric collar portion coaxially and rotatably received in the annular casing thereby to define therebetween a cable receiving annular space; an annular guide body concentrically and rotatably received in the cable receiving annular space and having a cable passing slot; and a flat cable having an inner end connected to the collar portion and an outer end connected to the annular casing. The flat cable passes through the cable passing slot, so that when the collar portion and the annular casing make a relative rotation therebetween, the flat cable is forced to make a roll wound on the collar portion in one direction or a roll wound within the cylindrical wall of the annular casing in the other direction. A coupling structure is further employed which couples the annular guide body and the annular rotor in a manner to permit a relative rotation therebetween.

13 Claims, 14 Drawing Sheets

CABLE TYPE ELECTRIC CONNECTOR

This application is a division of application Ser. No. 08/429,656, filed Apr. 27, 1995 now U.S. Pat. No. 5,630,723 issued on May 20, 1997.

The present invention is concerned with the subject matters described in co-pending U.S. patent application Ser. Nos. 08/361,043 (filed Dec. 21, 1994) and 08/364,043 (filed Dec. 27, 1994).

BACKGROUND OF THE INVENTION

1. Field of the Invention

The present invention relates in general to electric connectors, and more particularly to electric connectors of a type which connects two electric parts which are rotatable relative to each other. More specifically, the present invention is concerned with a cable type electric connector which generally comprises a first member connected to one fixed electrical part, and a second member connected to the other electrical part which rotates relative to the fixed electric part and a rolled resilient electric cable having both ends connected to the first and second members.

2. Description of the Prior Art

Hitherto, various cable type electric connectors of the above-mentioned type have been proposed and put into practical use. Some of them are those applied to a motor vehicle for establishing electric connection between an electrical part mounted on a steering wheel and another electrical part mounted on a fixed structure of the vehicle body. The connector comprises a first member connected to the steering wheel, a second member connected to the fixed structure and a rolled resilient electric cable having both ends connected to the first and second members. These connectors of this type are disclosed in, for example, U.S. Pat. No. 3,763,455 and Japanese Patent First Provisional Publications Nos. 4-310445, 5-13140, 5-207632 and 5-56543.

However, due to inherent constructions, these connectors have failed to give entire satisfaction to users in every particular. That is, some are costly, some are bulky, some are complicated and some need a very skilled technique for assembling the same.

SUMMARY OF THE INVENTION

It is therefore an object of the present invention to provide a cable type electric connector which is free of the above-mentioned drawbacks.

It is another object of the present invention to provide a cable type electric connector which is constructed to permit a smooth and reliable movement of a flat cable installed therein.

According to a first aspect of the present invention, there is provided a cable type electric connector which comprises an annular casing having a cylindrical wall; an annular rotor having a concentric collar portion, the collar portion being coaxially and rotatably received in the annular casing thereby to define therebetween a cable receiving annular space; an annular guide body concentrically and rotatably received in the cable receiving annular space, the annular guide body having a cable passing slot; a flat cable having an inner end connected to the collar portion and an outer end connected to the annular casing, the flat cable passing through the cable passing slot, so that when the collar portion and the annular casing make a relative rotation therebetween, the flat cable is forced to make a roll wound on the collar portion in one direction or a roll wound within the cylindrical wall of the annular casing in the other direction; and coupling means for coupling the annular guide body and said annular rotor in a manner to permit a relative rotation therebetween.

According to a second aspect of the present invention, there is provided a cable type electric connector which comprises an annular casing having a cylindrical wall; an annular rotor having a concentric collar portion, the collar portion being coaxially and rotatably received in the annular casing thereby to define therebetween a cable receiving annular space; an annular guide body concentrically and rotatably received in the cable receiving annular space, said annular guide body having a cable passing slot; a flat cable having an inner end connected to the collar portion and an outer end connected to the annular casing, said flat cable passing through the cable passing slot, so that when the collar portion and said annular casing make a relative rotation therebetween, the flat cable is forced to make a roll wound on the collar portion in one direction or a roll wound within the cylindrical wall of the annular casing in the other direction; a cable holder ring connected to a leading end of the collar portion, the cable holder ring having an annular groove into which one lateral edge of the flat cable is inserted; and a cable guide track formed on the annular guide body in a manner to face the annular groove of the cable holder ring, the cable guide track being capable of contacting with the other lateral edge of the flat cable.

BRIEF DESCRIPTION OF THE DRAWINGS

Other objects and advantages of the present invention will become apparent from the following description when taken in conjunction with the accompanying drawings, in which.

DETAILED DESCRIPTION OF THE EMBODIMENTS

Figure 1:
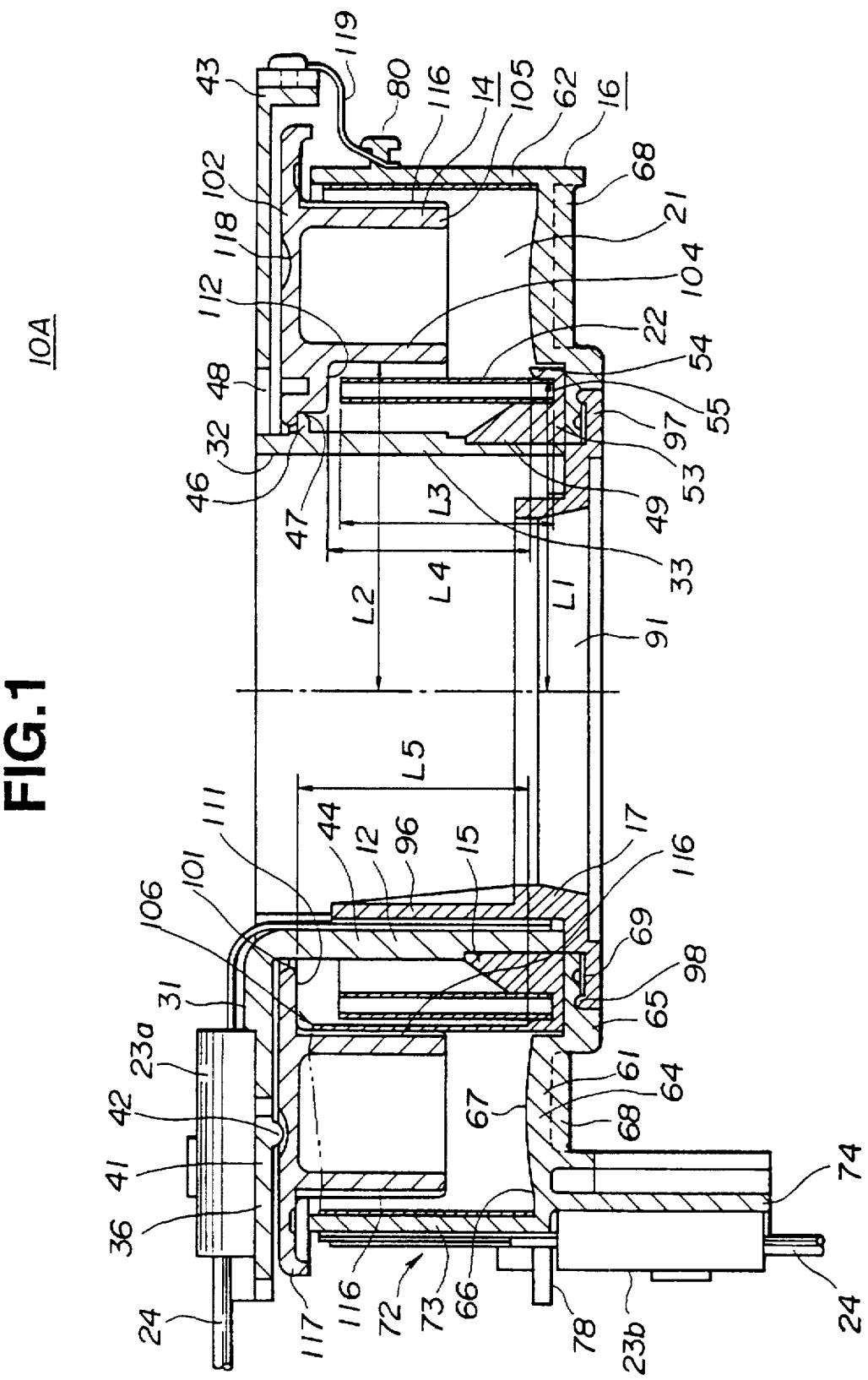
FIG. 1 is a sectional view of a cable type electric connector which is a first embodiment of the present invention.
Figure 2:
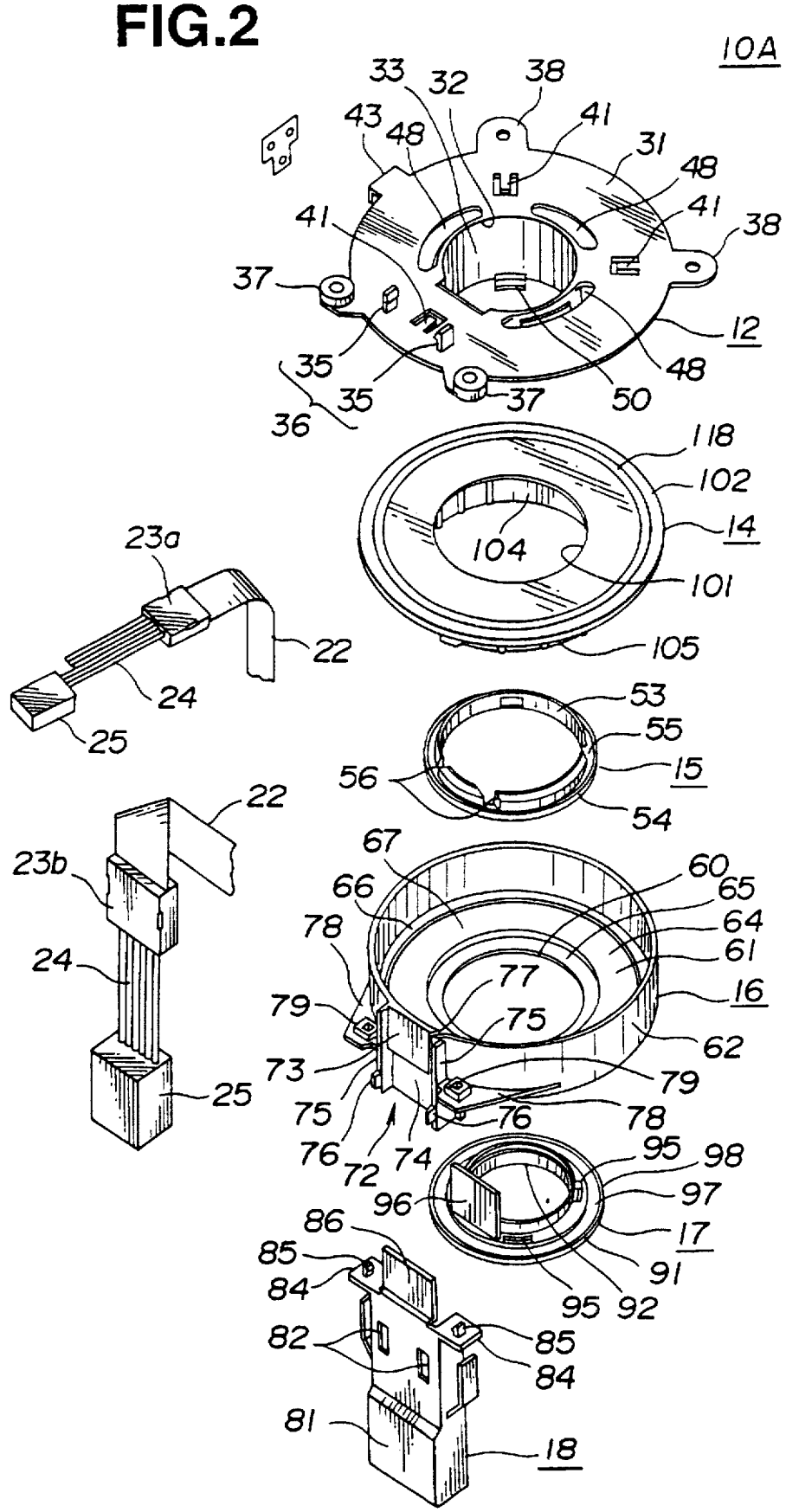
FIG. 2 is an exploded view of the connector of the first embodiment.
Figure 3:
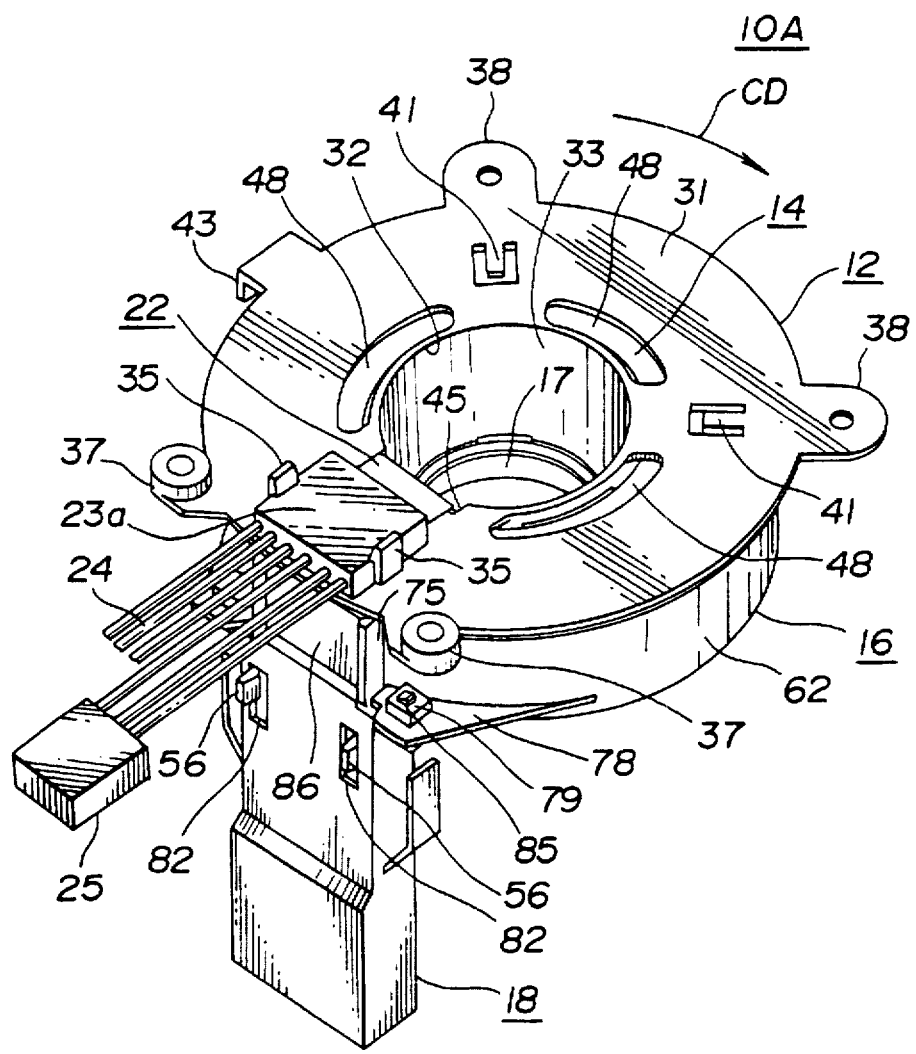
FIG. 3 is a perspective view of the connector of the first embodiment in an assembled condition.

Referring to FIGS. 1 to 6, particularly FIGS. 1 to 3, there is shown a cable type electric connector 10A which is a first embodiment of the present invention.

As will become apparent as the description proceeds, the connector 10A of this embodiment is arranged between an automotive steering wheel and a fixed portion of a vehicle body for connecting a first electric part mounted on the steering wheel and a second electric part mounted on the fixed portion. The first electric part is an air-bag device, a horn switch, an auto-speed control switch, an air conditioner control switch and/or an audio device control switch. The second electric part is a wire harness connector to which a battery, a vehicle collision sensor, a horn device, an auto-speed controller, an air conditioner and/or an audio device is connected through wires.

As is best seen from FIGS. 1 to 3, the connector 10A takes a generally annular shape and generally comprises a rotor 12, an annular guide body 14, a cable holder ring 15, an annular casing 16, a retainer ring 17 and a cable holder 18.

As will be described in detail hereinafter, the rotor 12 is connected to the steering wheel and the annular casing 16 is connected to a fixed portion of the vehicle body, so that when the steering wheel is rotated, the rotor 12 is rotated relative to the fixed annular casing 16. The parts 12, 14, 15, 16, 17 and 18 are all constructed of an engineering plastic such as polyacetal or the like.

That is, the rotor 12 is connected to the steering wheel to rotate therewith. The annular guide body 14 is coaxially arranged below the rotor 12 in a manner to be rotatable relative thereto. The cable holder ring 15 is detachably connected to a center collar portion 33 of the rotor 12. The annular casing 16 is coaxially arranged below the rotor 12 in a manner to receive therein the annular guide body 14 and the cable holder ring 15 and arranged to be rotatable relative to the rotor 12. The retainer ring 17 is fixed to a leading end of the center collar portion 33 of the rotor 12 to rotatably retain the annular casing 16 to the center collar portion 33. The cable holder 18 is secured to an outer wall of the annular casing 16.

As is seen from FIG. 1, the connector 10A has a cable receiving annular space 21 defined therein. More specifically, the annular space 21 is defined between the center collar portion 33 of the rotor 12 and a cylindrical wall 62 of the annular casing 16. Within the space 21, there is received a rolled flat cable 22 which is somewhat resilient.

Figure 11:
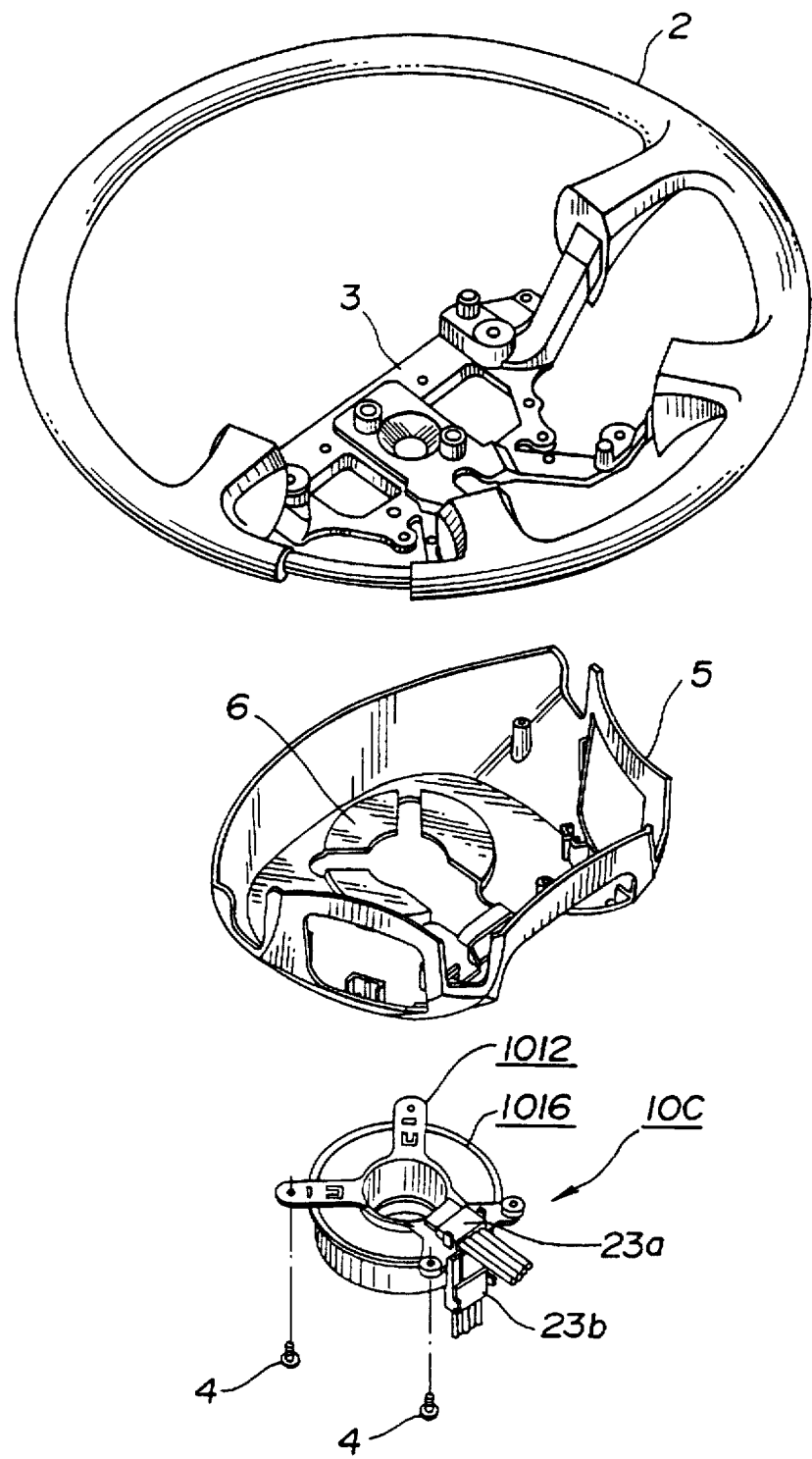
FIG. 11 is an illustration showing the manner in which the connector of the third embodiment is incorporated with a steering wheel unit.

As may be understood when referring to FIGS. 3 and 11, upon assembly of the connector 10A, the rotor 12 is secured to a back side of the steering wheel having a steering shaft (not shown) passed through a center bore (no numeral) thereof.

As is known, the steering shaft is operatively connected to a steering mechanism, so that, for steering the associated motor vehicle, the steering wheel can make about two or two and a half turns from its neutral position. That is, about four or five turns are available to the steering wheel between one locked terminal position and the other locked terminal position.

As will be seen from FIG. 2, the resilient flat cable 22 comprises a plurality of parallel wires embedded in an elongate flat insulating plastic cover. The flat cable 22 has inner and outer ends equipped with respective plugs 23a and 23b which are connected to the rotor 12 and the annular casing 16 in an after-mentioned manner.

Figure 4:
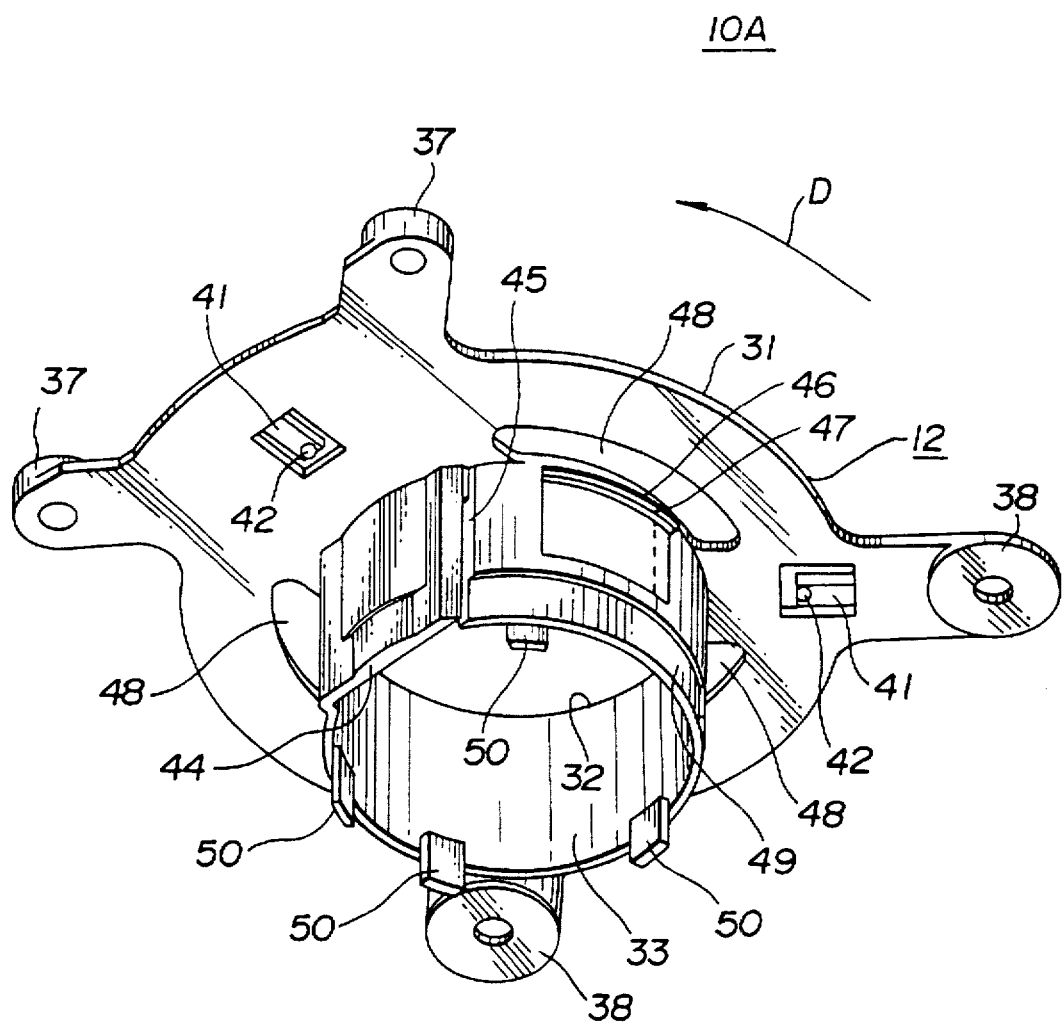
FIG. 4 is a perspective view of a rotor which is a part of the connector of the first embodiment.

As is seen from FIGS. 2 and 4, the rotor 12 comprises a generally circular upper wall 31 having a circular opening 32 at a center portion thereof. The center collar portion 33 extends downward from the peripheral portion of the circular opening 32. The circular upper wall 31 is formed at its upper surface with a pair of latching pawls 35 and 35 which face each other. These pawls 35 and 35 constitute an upper plug holder 36. The circular upper wall 31 is formed at its peripheral portion with four mounting lugs 37 and 38 which extend radially outwardly. These lugs 37 and 38 are to be secured to the back side of the steering wheel by means of bolts or the like. The circular upper wall 31 has further at the peripheral portion a stopper holding lug 43. At equally spaced portions of the circular upper wall 31, there are formed three tongues 41 each extending inwardly. The tongues 41 are resiliently flexible.

As is seen from FIG. 4, each tongue 41 has at its leading end a small projection 42 which projects downward. As will become apparent hereinafter, the projections 42 function to guide the rotational movement of the annular guide body 14 relative to the rotor 12. Three arcuate slots 48 formed in the circular upper wall 31 are those which were produced when the molded rotor 12 was released from a molding die (not shown).

As is best shown in FIG. 4, the center collar portion 33 is formed with an axially extending slit 45 through which an inner end portion of the flat cable 22 passes. As shown, the slit 45 is concealed by an edge of a rectangular flat structure 44 which constitutes a part of the center collar portion 33. The slit 45 and the rectangular flat structure 44 thus constitute a so-called inside cable leading portion.

As is seen from FIGS. 1 and 4, the center collar portion 33 is formed on its upper part with three equally spaced ridges 46 each extending in a circumferential direction. As will become apparent as the description proceeds, these ridges 46 function to rotatably support the annular guide body 14. Each ridge 46 is formed with a sloped surface 47 at its lower side, as is seen from FIG. 1. The sloped surface 47 facilitates the insertion of the ridge 46 into an after-mentioned circular opening 101 of the annular guide body 14.

As is seen from FIGS. 1 and 4, the center collar portion 33 is formed around its lower part with an annular recess 49. As is seen from FIG. 4, the lower end of the center collar portion 33 is formed with four latching pawls 50 each extending downward. As will be described in detail hereinafter, these latching pawls 50 function to catch the retainer ring 17.

As is seen from FIG. 2, the annular guide body 14 comprises a circular upper wall 102 having a circular opening 101 at a center portion thereof. The circular upper wall 102 is formed at its upper surface with an annular groove 118 which is concentric with the circular opening 101.

Figure 5:
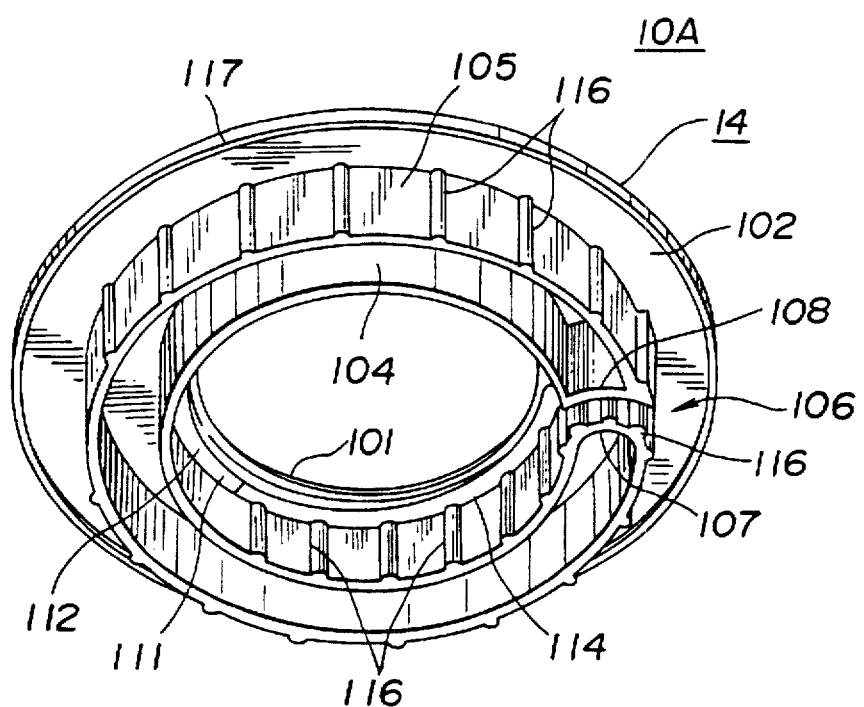
FIG. 5 is a perspective view of an annular guide body which is also a part of the connector of the first embodiment.

As is understood from FIG. 5, integrally connected to a lower surface of the circular upper wall 102 are inner and outer cylindrical walls 104 and 105 which are both coaxial with the circular opening 101. As shown, these two cylindrical walls 104 and 105 are connected at given portions to provide a smoothly curved slot 106 which extends radially to communicate the inside of the inner cylindrical wall 104 with the outside of the outer cylindrical wall 105. The curved slot 106 is defined between two mutually facing convex and concave walls 107 and 108, each extending between the inner and outer cylindrical walls 104 and 105.

In addition to the above, the annular guide body 14 has the following unique structure.

That is, as is seen from FIG. 5, the lower surface of the circular upper wall 102 has, between the periphery of the center opening 101 and the inner cylindrical wall 104, an annular guide track 111 which is concentric with the center opening 101.

Figure 6:
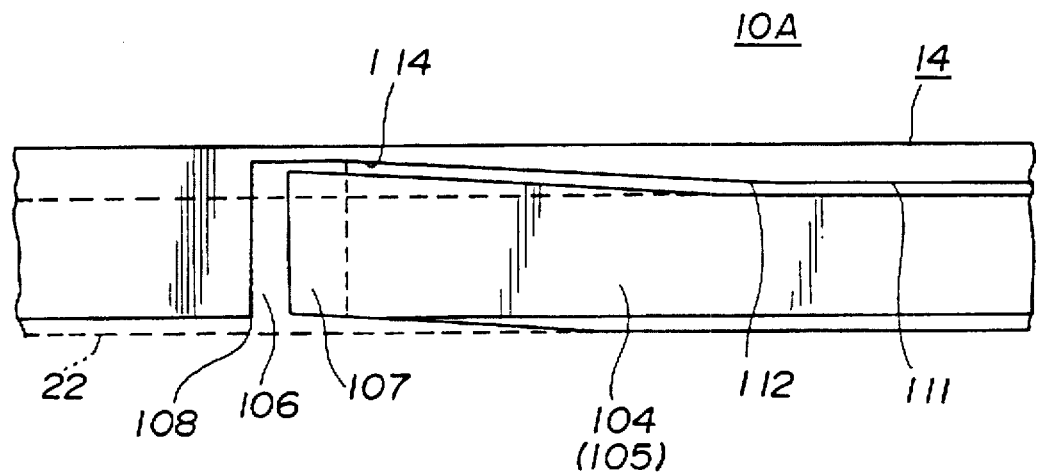
FIG. 6 is an enlarged and partial side view of the annular guide body of FIG. 5.

As is understood from FIG. 6, the annular guide track 111 includes a sloped portion 114 which extends from the position of the curved slot 106 to an inflection portion 112 of about two third of the entire length of the annular guide track 111 and a flat portion (no numeral) which extends from the inflection portion 112 to the terminal position, that is, the position of the curved slot 106. That is, with increase of the circumferential distance from the curved slot 106 to the inflection portion 112, the height of the annular guide track 111 is gradually reduced, but from the inflection portion 112 to the curved slot 106 through the remaining portion, the annular guide track 111 is in flash with the lower surface of the circular upper wall 102.

If desired, the annular guide track 111 may be sloped throughout the entire length thereof. That is, in this case, with increase of the circumferential distance from the curved slot 106 to the same slot, the height of the annular guide track 111 is gradually reduced.

As is seen from FIG. 5, the outer cylindrical wall 105 is formed at its outer cylindrical surface with a plurality of spaced ridges 116 each extending axially. About one third of the inner cylindrical wall 104 is formed at its inner cylindrical surface with a plurality of spaced ridges 116 each extending axially. Furthermore, the convex wall 107 is formed at its outer surface with several spaced ridges 116 each extending axially. The circular upper wall 102 has a peripheral edge portion 117 which is bent downward.

As is seen from FIGS. 1 and 2, the cable holder ring 15 comprises an annular base portion 53 which is mated with the annular recess 49 of the center collar portion 33 of the rotor 12, a cylindrical outer wall 54 which extends around the annular base portion 53 and an annular lower wall (no numeral) which extends between a lower end of the annular base portion 53 and that of the cylindrical outer wall 54. Thus, an annular groove 55 is defined by these three parts. The height of the annular base portion 53 is greater than that of cylindrical outer wall 54. The annular base portion 53 is formed with two slits 56 which are latchedly engaged with opposed ends of the afore-mentioned rectangular flat structure 44 of the center collar portion 33 of the rotor 12. As is seen from FIG. 1, the annular base portion 53 is reinforced by a plurality of reinforcing ribs each having a sloped top.

For the reason which will be described hereinafter, the diameter of an imaginary circle which passes the tops of the ridges 116 of the inner cylindrical wall 104 of the annular guide body 14 is smaller than the diameter of the cylindrical outer wall 54 of the cable holder ring 15.

As is seen from FIGS. 1 to 3, the annular casing 16 comprises a circular lower wall 61 having a circular center opening 60 at a center portion thereof. A cylindrical wall 62 extends upward from the outer periphery of the circular lower wall 61. The circular lower wall 61 is formed around the center opening 60 with an annular recess 65 which is depressed downward from an upper major surface 64 of the circular lower wall 61. The annular recess 65 is concentric with the center opening 60. As will become apparent hereinafter, the annular recess 65 rotatably receives therein the cable holder ring 15.

As is seen from FIGS. 1 and 2, the upper major surface 64 of the circular lower wall 61 is formed with a convex annular portion 67 to which the lower edge of the flat cable 22 slidably contacts. That is, the middle part of the annular portion 67 is smoothly raised. An outer annular recess 66 is formed around the convex annular portion 67.

As is understood from FIG. 1, the top of the convex annular portion 67 is higher than the top of the cylindrical outer wall 54 of the cable holder ring 15. The circular lower wall 61 of the annular casing 16 is formed on its lower surface with a plurality of reinforcing ribs 68 which extend radially outward. Furthermore, the circular lower wall 61 is formed at a lower side of the annular recess 65 with an annular groove 69 which is concentric with the center opening 60.

As is best shown in FIG. 2, the cylindrical wall 62 of the annular casing 16 is formed with an axially extending slit 77 through which an outer end portion of the flat cable 22 passes to the outside. As shown, the slit 77 is concealed by an edge of a rectangular flat structure 73 which constitutes a part of the cylindrical wall 62. The rectangular flat structure 73 has a downward extension 74 which is thicker than the flat structure 73. These flat structure 73 and the extension 74 thus constitute a so-called outside cable leading portion 72. Side walls 75 of this outside cable leading portion 72 are formed at lower portions thereof with respective latching pawls 76. Beside the side walls 62, there are provided flat plate 78 which are integral with and extend radially outward from the cylindrical wall 62. Each flat plate 78 is formed at a raised portion with a latching opening 79. As is seen from FIG. 1, the cylindrical wall 62 of the annular casing 16 is formed with an anchor stud 80.

As is shown in FIG. 2, the retainer ring 17 comprises an annular base portion 91 which has a circular center opening 92. A small cylindrical wall 93 extends upward from the peripheral portion of the center opening 92. Four latching slots 95 are formed in the annular base portion 91, which are to be engaged with the above-mentioned latching pawls 50 of the rotor 12. A rectangular flat plate 96 extends upward from the annular base portion 91. When properly assembled, the flat plate 96 functions to cover an inner surface of the above-mentioned rectangular flat structure 44 of the center collar portion 33 of the rotor 12. The annular base portion 91 is formed with an annular recess 97 which faces the above-mentioned annular recess 65 of the annular casing 16. The annular recess 97 is formed with an annular bank 98 which is slidably engaged with the annular groove 69 of the annular casing 16.

As is seen from FIGS. 2 and 3, the cable holder 18 is formed with a cover portion 81. The cover portion 81 is formed with two rectangular openings 82 with which the above-mentioned latching pawls 76 of the annular casing 16 are engaged. Furthermore, the cover portion 81 is formed at its shoulder portion with two flat lugs 84. The lugs 84 are formed with latching pawls 85 which are engaged with the above-mentioned latching openings 79 of the annular casing 16. A rectangular plate 86 extends upward from the cover portion 81.

In the following, the procedure for assembling the connector 10A will be described with reference to the drawings, particularly FIG. 2.

First, the annular guide body 14 is coupled with the center collar portion 33 of the rotor 12 in such a manner that the peripheral edge of the circular opening 101 of the annular guide body 14 is slidably put on the three spaced ridges 46 of the collar portion 33. With this, the annular guide body 14 is rotatably held by the rotor 12. Under this condition, the small projections 42 of the tongues 41 of the rotor 12 are resiliently pressed against and slidably engaged with the annular groove 118 of the annular guide body 14 to assure smoothed rotation of the annular guide body 14 relative to the rotor 12.

Next, the plug 23a of the flat cable 22 is put between the latching pawls 35 and 35 of the rotor 12 to be fixed to the rotor 12. The flat cable 22 extending from the plug 23a is flexed downward along the rectangular flat structure 44 of the center collar portion 33, and then bent at generally right angles and led to the outside of the center collar portion 33 through the slit 45.

Then, the flat cable 22 is passed through the curved slot 106 of the annular guide body 14 permitting the leading end portion thereof to extend radially outward from the curved slot 106. Then, the cable holder ring 15 is mated with the annular recess 49 of the center collar portion 33 of the rotor 12 in such a manner that the two slits 56 of the cable holder ring 15 are respectively engaged with opposed ends of the rectangular flat structure 44 of the center collar portion 33. With this, the rotor 12 and the cable holder ring 15 are connected to constitute an annular integral unit to which the annular guide body 14 is rotatable.

Then, with the annular guide body 14 kept stationary, the rotor 12 is turned in a clockwise direction in FIG. 2, that is, in the direction of the arrow "D" shown in FIG. 4. With this, the flat cable 22 is drawn into the inside of the inner cylindrical wall 104 and wound around the center collar portion 33 of the rotor 12.

During this winding of the flat cable 22 on the center collar portion 33, the lower edge of the flat cable 22 is led into the annular groove 55 of the cable holder ring 15.

Then, the leading end portion of the flat cable 22, which has been left at the outer side of the outer cylindrical wall 105 of the annular guide body 14, is inserted into the slit 77 of the annular casing 16 from the inside and exposed to the outside of the annular casing 16. The exposed end portion of the flat cable 22 is then bent at generally right angles. Then, the other plug 23a connected to the exposed leading end of the flat cable 22 is put between the latching pawls 76 of the annular casing 16 to be fixed to the annular casing 16.

Then, the annular casing 16 is coupled with the rotor 12 while receiving the annular guide body 14. Then, the retainer ring 17 is put in the annular groove 69 (see FIG. 1) of the circular lower wall 61 of the annular casing 16 and then the retainer ring 17 is slightly turned to a certain position wherein the four latching slots 95 thereof respectively face the four latching pawls 50 of the center collar portion 33 of the rotor 12. Then, the retainer ring 17 is pushed against the latching pawls 50 to establish latching engagement between the latching slots 95 and the latching pawls 50 and thus between the retainer ring 17 and the rotor 12.

Then, the cable holder 18 is attached to the outside cable leading portion 72 of the annular casing 16 in the aforementioned manner.

With these steps, the connector 10A is assembled. Under this assembled condition, the annular casing 16 is rotatably sandwiched, at the peripheral portion of the circular opening 60 thereof, between the lower annular surface of the cable holder ring 15 and the upper annular surface of the retainer ring 17 which are both fixed to the center collar portion 33 of the rotor 12.

As is understood from FIG. 1, upon assembly, the flat cable 22 is received in the cable receiving annular space 21 which is defined between the center collar portion 33 of the rotor 12 and the cylindrical wall 62 of the annular casing 16.

More specifically, the flat cable 22 in the space 21 has an inner flat cable part wound around the center collar portion 33, an outer flat cable part rolled within the cylindrical wall 62 and an intermediate flat cable part passing through the curved slot 106 of the annular guide body 14.

It is to be noted that the inner and outer flat cable parts are rolled in opposite directions. That is, when the connector 10A is viewed from the top, the inner flat cable part is wound in a counterclockwise direction, while the outer flat cable part is rolled in a clockwise direction.

As is seen from FIG. 1, when the radius of the cylindrical outer wall 54 of the cable holder ring 15 is designated by "L1" and the radius of the inner cylindrical wall 104 of the annular guide body 14 is designated by "L2", the following equation is established in the connector 10A.

$$L1 < L2 \tag{1}$$

With this, the flat cable 22 led into the annular groove 55 of the cable holder ring 15 is prevented from contacting the inner cylindrical wall 104 of the annular guide body 14.

Furthermore, when the width of the flat cable 22 is designated by "L3" and the distance between the upper end of the cylindrical outer wall 54 and the inflection position 112 is designated by "L4" and the distance between the upper end of the cylindrical outer wall 54 and the circular upper wall 102 is designated by "L5", the following equations are established in the connector 10A.

$$L3 > L4 \tag{2}$$

$$L3 \leq L5 \tag{3}$$

With these relationships, at positions other than the position near the curved slot 106, the flat cable 22 is prevented from expanding outward disengaging from the annular groove 55.

The axial lengths of the inner and outer cylindrical walls 104 and 105 are about a half of the axial length of the cable receiving annular space 21. Thus, lower ends of these two walls 104 and 105 are prevented from abutting against the upper major surface 64 of the annular casing 16.

As is seen from FIG. 1, when it is needed to transport the assembled connector 10A to a remote place, a stopper 119 is employed which latches the anchor stud 80 of the annular casing 16 with the stopper holding lug 43 of the rotor 12. With the stopper 119, relative rotation between the rotor 12 and the annular casing 16 is suppressed.

As has been described hereinbefore, when mounted on a vehicle, the rotor 12 is secured to the steering wheel and the annular casing 16 is connected to a fixed portion of the vehicle body.

In the following, operation of the electric connector 10A will be described.

For ease of description, one annular space defined between the center collar portion 33 of the rotor 12 and the inner cylindrical wall 104 of the annular guide body 14 will be called as "inner annular space", and the other annular space defined between the outer cylindrical wall 105 of the annular guide body 14 and the cylindrical wall 62 of the annular casing 16 will be called as "outer annular space". These two annular spaces are connected through the curved slot 106 of the annular guide body 14.

When the steering wheel is turned in a clockwise direction to the rightmost terminal position, most of the flat cable 22 is drawn into the inner annular space through the curved slot 106 and wound around the center collar portion 33 of the rotor 12. Under this condition, the lower edge of the wound flat cable 22 is received in the annular groove 55 of the cable holder ring 15.

When now the steering wheel is turned in the opposite direction, that is, in a counterclockwise direction, the flat cable 22 is released from the center collar portion 33 and expanded in the inner annular space. During this, the lower edge of the flat cable 22 is pressed against the cylindrical outer wall 54 of the cable holder ring 15 which rotates together with the center collar portion 33.

When the steering wheel is further turned in the same direction, the flat cable 22 is drawn out to the outer annular space through the curved slot 104 of the annular guide body 14. During this, at positions of the annular guide track 111 other than the position near the convex wall 107 of the curved slot 106, upward displacement of the flat cable 22 is prevented by the annular guide track 111 and thus the lower edge of the flat cable 22 is kept received in the annular groove 55 of the cable holder ring 15. However, at the position near the convex wall 107 of the curved slot 106, the flat cable 22 is permitted to move upward and then the flat cable 22 is raised upward by the convex upper major surface 64 of the annular casing 16, so that the flat cable 22 can easily ride over the cylindrical outer wall 54 of the cable holder ring 15.

Like this, the flat cable 22 is drawn out through the curved slot 106 to the outer annular space while making a generally U-shaped turn back portion at the curved slot 106. The flat cable 22 thus drawn to the outer annular space is pressed against the cylindrical wall 62 of the annular casing 16 while making a larger roll thereof. Because the annular guide body 14 is rotatably held by the rotor 12, the counterclockwise rotation of the rotor 12 induces a slower rotation of the annular guide body 14 in the same direction.

When the steering wheel is further turned to the leftmost terminal position, most of the flat cable 22 is drawn into the outer annular space and pressed against the cylindrical wall 62 of the annular casing 16 while making a multi-turned larger roll thereof.

When now the steering wheel is turned in a clockwise direction again, the flat cable 22 is drawn into the inner annular space through the curved slot 106 and wound around the center collar portion 33 of the rotor 12. That is, the flat cable 22 passes through the curved slot 106, rides over the cylindrical outer wall 54 of the cable holder ring 15 and comes into the inner annular space. During this, the flat cable 22 is pressed down by the sloped portion 114 of the annular guide track 111 and thus led into the annular groove 55 of the cable holder ring 15. Furthermore, during the rotation of the rotor 12, the flat cable 22 keeps pushing the convex wall 107 of the curved slot 106 inducing a slower rotation of the annular guide body 14 in the same direction.

When the steering wheel is further turned and comes to the rightmost terminal position, most of the flat cable 22 is wound about the center collar portion 33 of the rotor 12.

In the following, advantages of the electric connector 10A, which is the first embodiment of the invention, will be described.

Due to provision of the cable holder ring 15 and the annular guide track 111 which have the above-mentioned structures, only a part of the flat cable 22, which forms the U-shaped turn back portion at the curved slot 106, contacts the upper major surface 64 of the annular casing 16. This reduces the friction between the flat cable 22 and the major surface 64 of the annular casing 16, and thus the flat cable 22 can move smoothly in the cable receiving annular space 21. If the cable holder ring 15 is not provided, the entire of the lower edge of the flat cable 22 is forced to contact with the upper major surface 64 inducing a marked friction between these two contacting parts.

The upper major surface 64 of the annular casing 16 is formed with the convex annular portion 67 to which the lower edge of the U-shaped turn back portion of the flat cable 22 contacts. Accordingly, the flat cable 22 releasing from the annular groove 55 of the cable holder ring 15 is prevented from contacting the upper edge of the cylindrical outer wall 54 of the cable holder ring 15. This means that the smoothed movement of the flat cable 22 in the cable receiving annular space 21 is much promoted.

The radius "L1" of the cylindrical outer wall 54 of the cable holder ring 15 is smaller than the radius "L2" of the inner cylindrical wall 104 of the annular guide body 14. Thus, when, due to counterclockwise rotation of the rotor 12, the flat cable 22 wound around the center collar portion 33 is expanded radially outward, the expanded flat cable 22 is pressed against the cylindrical outer wall 54. That is, the expanded flat cable 22 is prevented from contacting the inner cylindrical wall 104 of the annular guide body 14, which reduces the frictional resistance between the flat cable 22 and the annular guide body 14.

Due to the above-mentioned dimensional relationship denoted by the equations (2) and (3), releasement of the flat cable 22 from the annular groove 55 of the cable holder ring 15 is permitted at only the position near the curved slot 106. That is, at positions of the annular guide track 111 other than the position near the curved slot 106, the flat cable 22 is prevented from disengaging from the annular groove 55, which promotes the smoothed and reliable movement of the flat cable 22 in the cable receiving annular space 21.

Due to the sloped construction of the annular guide track 111 of the annular guide body 14, the disengagement of the flat cable 22 from the annular groove 55 of the cable holder ring 15 can be made much smoother. That is, during the disengagement, the flat cable 22 is smoothly guided by the sloped portion 114.

Due to provision of the ridges 116 on both the outer cylindrical wall 105 and the inner cylindrical wall 104 of the annular guide body 14, the friction between the flat cable 22 and each of the walls 105 and 104 is remarkably reduced, so that the flat cable 22 and the annular guide body 14 can smoothly move in the cable receiving annular space 21.

Because the ridges 116 of the inner cylindrical wall 104 project radially inward beyond the inner cylindrical wall 104 of the annular guide body 14, the flat cable 22 in the inner annular space near the curved slot 106 is prevented from contacting the cylindrical outer wall 54 of the cable holder ring 15. This induces a smoothed movement of the flat cable 22 through the curved slot 106.

Because the annular guide body 14 is rotatably supported by the rotor 14, it is possible to provide a certain space between the lower edges of the inner and outer cylindrical walls 104 and 105 of the annular guide body 14 and the upper major surface 64 of the circular lower wall 61 of the annular casing 16. This induces a smoothed rotation of the annular guide body 14 relative to the rotor 12.

In the following, modifications of the connector 10A of the first embodiment will be described.

Figure 7:
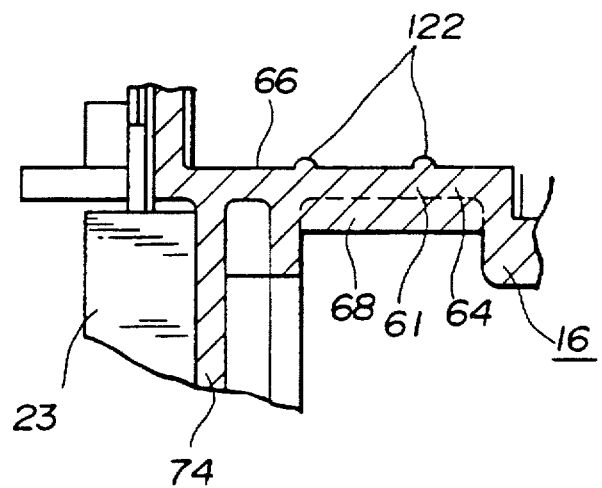
FIG. 7 is a partial sectional view of a modified annular casing which can be used as a part of the connector of the first embodiment.

In FIG. 7, one modification 10A' is shown.

In this modification 10A', in place of the above-mentioned convex annular portion 67, the upper major surface 64 of the annular casing 16 is formed with two annular ridges 122 and 122 to which the lower edge of the flat cable 22 slidably contacts. If desired, only one annular ridge or more than two annular ridges may be used.

If desired, the ridges 116 formed on the inner and outer cylindrical walls 104 and 105 of the annular guide body 14 may be each shaped to extend around the cylindrical surface or diagonally on the cylindrical surface. Each ridge 116 may have a spherical or a tapered top. Furthermore, the concave wall 108 of the curved slot 106 may have ridges like the ridges 116, and the ridges 116 may be formed on the entire of the cylindrical surface of the inner cylindrical wall 104.

Furthermore, if desired, the center collar portion 33 of the rotor 12 and the cable holder ring 15 may be molded into a united structure.

Figure 8:
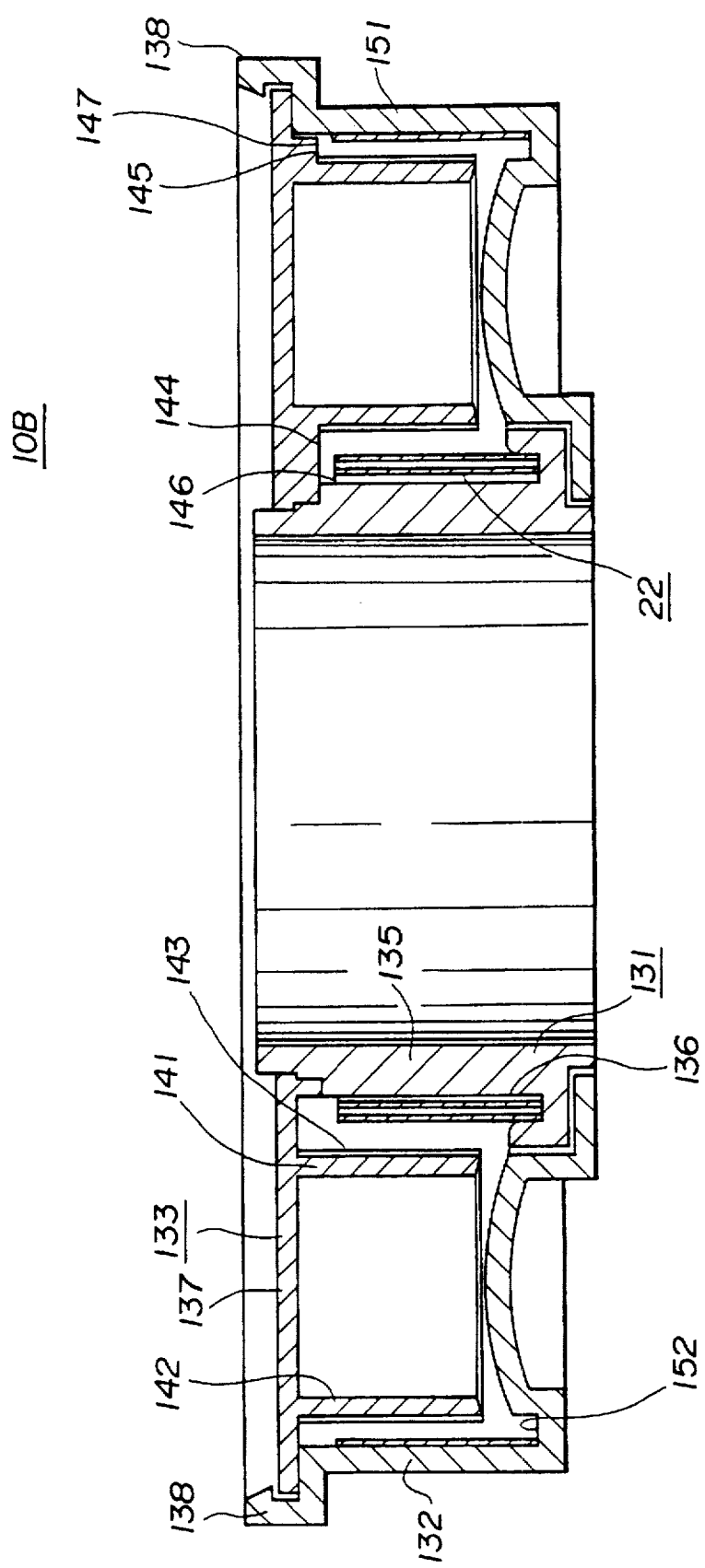
FIG. 8 is a view similar to FIG. 1, but showing a cable type electric connector of a second embodiment of the present invention.

Referring to FIG. 8, there is shown a cable type electric connector 10B which is a second embodiment of the present invention.

As will become apparent as the description proceeds, in this second embodiment 10B, means corresponding to the above-mentioned annular groove 55 is an annular or cylindrical rotor 131; and means corresponding to the above-mentioned annular guide track 111 is an annular guide body 133.

As shown in FIG. 8, the connector 10B generally comprises a flat cable 22, the cylindrical rotor 131, an annular casing 132 and the annular guide body 133. The cylindrical rotor 131 comprises a collar portion 135. The collar portion 135 has therearound an annular grooved portion 136 integrally connected thereto. The annular casing 132 is formed at its upper peripheral portion with a plurality of engaging pawls 138 by which a peripheral portion of an annular upper wall 137 of the annular guide body 133 is slidably supported. Between the annular casing 132 and the cylindrical rotor 133, there is rotatably received the annular guide body 133.

The annular guide body 133 has inner and outer cylindrical walls 141 and 142 which extend downward from the annular upper wall 137. Although not shown in the drawing, a curved slot 143 corresponding to the curved slot 106 of the above-mentioned first embodiment 10A is provided, which extends between the inner and outer cylindrical walls 141 and 142.

An inner annular space 144 is defined between the collar portion 135 of the rotor 131 and the inner cylindrical wall 141 of the annular guide body 133, and an outer annular space 145 is defined between the outer cylindrical wall 142 of the annular guide body 133 and the outer cylindrical wall 151 of the annular casing 132.

The inner and outer annular spaces 144 and 145 have at their upper portions annular guide tracks 146 and 147 each being defined by the annular guide body 133. These tracks 146 and 147 are sloped in substantially the same manner as the above-mentioned annular guide track 111 of the first embodiment 10A.

The outer annular space 145 has at its lower portion an annular groove 152 defined by the annular casing 132. The annular groove 152 extends around the inner surface of the outer cylindrical wall 151.

Upon assembly of the connector 10B, the outer flat cable part (viz., a part of the flat cable 22 which is received in the outer annular space 145) is enforcedly put in the annular groove 152 and vertically positioned by the annular guide track 147.

Figure 9:
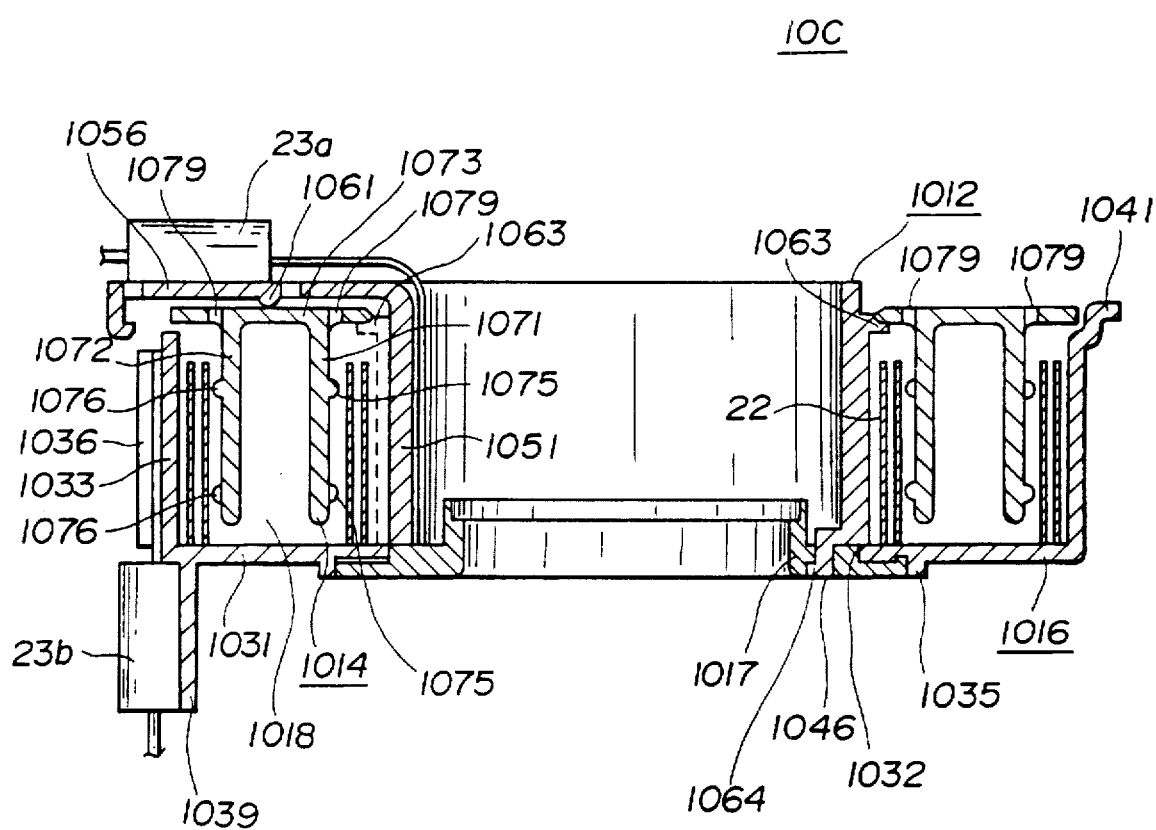
FIG. 9 is a sectional view of a cable type electric connector of a third embodiment of the present invention.
Figure 10:
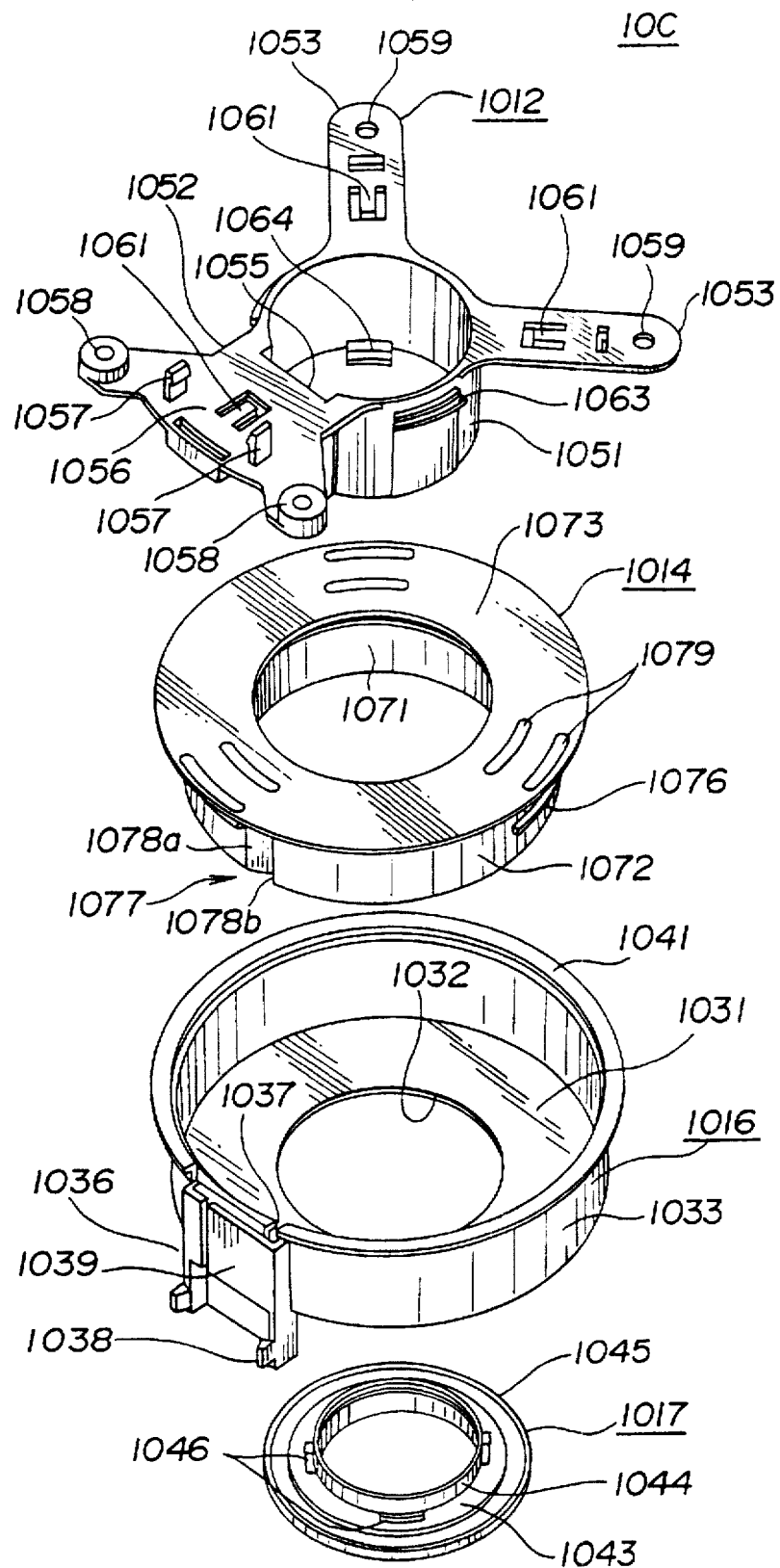
FIG. 10 is an exploded view of the connector of the third embodiment.

Referring to FIGS. 9 to 11, particularly FIG. 10, there is shown a cable type electric connector 10C which is a third embodiment of the present invention.

FIG. 11 shows a steering wheel 2 to which the connector 10C is mounted. The steering wheel 2 has a center boss portion 3 whose lower side is covered by a lower cover 5. The lower cover 5 is formed with a circular recess 6 into which the connector 10C is neatly received. Denoted by numerals 4 and 4 are bolts by which the connector 10C is secured to the boss portion 3 of the steering wheel 2.

As is seen from FIG. 10, the connector 10C of the third embodiment generally comprises a rotor 1012, an annular guide body 1014, an annular casing 1016 and a retainer ring 1017.

As is seen from FIG. 9, the assembled connector 10C has a cable receiving annular space 1018 defined therein. Within the annular space 1018, there are operatively received a rolled flat cable 22 and a major portion of the annular guide body 1014.

The rotor 1012 is connected to the steering wheel 2 and the annular casing 1016 is connected to a fixed portion of the vehicle body.

As shown in FIG. 10, the rotor 1012 comprises a collar portion 1051 and three arm portions 1052, 1053 and 1053 each extending radially outward from the upper end of the collar portion 1051.

The largest arm portion 1052 has at its base part a recess 1055 through which an inner end portion of the flat cable 22 is inserted into the interior of the collar portion 1051. The arm portion 1052 is formed at its upper surface with a pair of latching pawls 1057 and 1057 which face each other. These latching pawls detachably hold a plug 23a which is fixed to an inner end of the flat cable 22. The latching pawls 1057 and 1057 thus constitute an upper plug holder 1056. The arm portion 1052 is further formed with two mounting lugs 1058 and 1058. These lugs are to be secured to the lower cover 5 of the steering wheel 2 through the bolts 4.

The other arm portions 1053 and 1053 are formed at their leading ends with bolt openings 1059 and 1059 through which the bolts 4 pass for connecting the arm portions 1053 to the lower cover 5 of the steering wheel 2.

The arm portions 1052, 1053 and 1053 are respectively formed with tongue-shaped projections 1061 which resiliently abut against an upper part of the annular guide body 1014 in an after-mentioned manner.

The collar portion 1051 is formed on its upper part with three equally spaced ridges 1063 each extending in a circumferential direction. These ridges 1063 function to rotatably support the annular guide body 1014, as will become apparent hereinafter.

The collar portion 1051 is formed at its lower end with four latching pawls 1064 which hold the retainer ring 1017 in an after-mentioned manner.

The annular guide body 1014 comprises a circular upper wall 1073 and concentric inner and outer cylindrical walls 1071 and 1072 each projecting downward from the circular upper wall 1073.

As is understood from FIG. 9, the inner cylindrical wall 1071 is formed at its inner surface with a plurality of circumferentially extending arcuate ridges 1075, and the outer cylindrical wall 1072 is formed at its outer surface with a plurality of circumferentially arcuate ridges 1076. Each ridge 1075 or 1076 may have a rectangular cross section or a spherical cross section.

Referring back to FIG. 10, the inner and outer cylindrical walls 1071 and 1072 are connected at given portions to form a smoothly curved slot 1077 which extends radially to communicate the inside of the inner cylindrical wall 1071 and the outside of the outer cylindrical wall 1072. The curved slot 1077 is defined between two mutually facing convex and concave walls 1078a and 1078b, each extending between the inner and outer cylindrical walls 1071 and 1072.

The circular upper wall 1073 has an outer diameter which is larger than that of the outer cylindrical wall 1072, and an inner diameter which is smaller than that of the inner cylindrical wall 1071. Denoted by numerals 1079 are arcuate slots which were formed in the annular guide body 1014 when associated molds were released from the product.

The annular casing 1016 comprises a circular lower wall 1031 having a circular center opening 1032 at a center portion thereof. A cylindrical wall 1033 extends upward from the outer periphery of the circular lower wall 1031. The upper surface of the circular lower wall 1031 is flat, and, as is understood from FIG. 9, the lower surface of the wall 1031 is formed near the center opening 1032 thereof with an annular ridge 1035 by which an annular recess (no numeral) is defined around the center opening 1032.

As is seen from FIG. 10, the cylindrical wall 1033 of the annular casing 1016 is formed with an axially extending slit 1037 through which an outer end portion of the flat cable 22 passes to the outside. As shown, the slit 1037 is concealed by a rectangular flat structure 1039. The slit 1037 and the rectangular flat structure 1039 constitute a so-called outside cable leading portion 1036. The flat structure 1039 has at a downward extension thereof a pair of latching pawls 1038 and 1038 which face each other. The latching pawls detachably hold a plug 23b which is fixed to an outer end of the flat cable 22. The cylindrical wall 62 is formed at its upper edge with an outwardly projected flange 1041.

The retainer ring 1017 comprises an annular flange 1045 which is formed on the periphery thereof, an annular raised step 1043 which is concentric with the center opening thereof and a shorter cylindrical wall 1044 which extends upward from the peripheral portion of the center opening. Four latching slots 1046 are formed in the retainer ring 1017 at equally spaced intervals, which are to be engaged with the above-mentioned latching pawls 1064 of the rotor 1012.

FIG. 9 shows the assembled condition of the connector 10C. In the assembled condition, the various parts of the connector 10C have the following positional relationship.

That is, the annular guide body 1014 is rotatably disposed about the collar portion 1051 of the rotor 1012 having the peripheral edge of the center opening thereof slidably engaged with the three ridges 1063 of the rotor 1012. The tongue-shaped projections 1061 of the rotor 12 resiliently abut against the circular upper wall 1073 of the annular guide body 1014. With this, relative play between the rotor 1012 and the annular guide body 1014 is suppressed. The two coupled parts 1012 and 1014 are put in the annular casing 1016 having the four latching pawls 1064 of the collar portion 1051 projected outward from the center opening 1032 of the annular casing 1016. The latching pawls 1064 are engaged with the latching slots 1046 of the retainer ring 1017 which is mated with the center opening 1032 of the annular casing 1016 from the back side. Thus, the annular guide body 1014 and the annular casing 1016 are rotatably disposed between the rotor 1012 and the retainer ring 1017. The outer peripheral portion of the circular upper wall 1073 of the annular guide body 1014 slidably puts on the outward flange 1041 of the annular casing 1016.

Due to provision of the inner and outer cylindrical walls 1071 and 1072 of the annular guide body 1014 which are projected into the annular casing 1016, the cable receiving annular space 1017 is divided into two major spaces which are an inner annular space defined between the collar portion 1051 of the rotor 1012 and the inner cylindrical wall 1071 of the annular guide body 1014 and an outer annular space defined between the outer cylindrical wall 1072 of the annular guide body 1014 and the cylindrical wall 1033 of the annular casing 1016. These two annular spaces are connected through the curved slot 1077 of the annular guide body 1014.

As is seen from FIG. 9, upon assembly of the connector 10C, the flat cable 22 has an inner part thereof received in the inner annular space, an outer part thereof received in the outer annular space and a middle part passed through the curved slot 1077 of the annular guide body 1014. More specifically, like in the case of the above-mentioned first embodiment 10A, the inner part of the flat cable 22 is wound on the collar portion 1051 of the rotor 1012 in one direction and the outer part of the flat cable 22 is rolled in the other direction. That is, when the connector 10C of FIG. 9 is viewed from the top, the inner flat cable part is rolled in a counterclockwise direction and the outer flat cable part is rolled in a clockwise direction.

In the following, operation of the electric connector 10C will be described.

When the steering wheel is turned in a clockwise direction to the rightmost terminal position, most of the flat cable 22 is drawn into the inner annular space through the curved slot 1077 and wound around the collar portion 1051 of the rotor 1012.

When now the steering wheel is turned in the opposite direction, that is, in a counterclockwise direction, the flat cable 22 is released from the collar portion 1051 and expanded radially outward in the inner annular space and thus pressed against an inner surface of the inner cylindrical wall 1071.

When the steering wheel is further turned in the same direction, the flat cable 22 is drawn out to the outer annular space through the curved slot 1077 of the annular guide body 1014. During this, the flat cable 22 makes a generally U-shaped turn back portion at the curved slot 1077 while pressing the concave wall 1078b of the curved slot 1077. Because the annular guide body 1014 is rotatably held by the rotor 1012, the counterclockwise rotation of the rotor 12 induces a slower rotation of the annular guide body 1014 in the same direction. The flat cable 22 thus drawn to the outer annular space is pressed against the cylindrical wall 1033 of the annular casing 1016 while making a roll thereof.

When the steering wheel is further turned to the leftmost terminal position, most of the flat cable 22 is led in the outer annular space and pressed against the cylindrical wall 1033 while forming a multi-turned roll thereof.

When now the steering wheel is turned in the opposite direction, that is, in a clockwise direction, the flat cable 22 is drawn into the inner annular space through the curved slot 1077 and wound around the collar portion 1051 of the rotor 1012. During the clockwise rotation of the rotor 1012, the flat cable 22 pushes the convex wall 1078a of the curved slot 1077 thereby inducing a lower rotation of the annular guide body 1014 in the same direction.

In the following, advantages of the electric connector 10C, which is the third embodiment of the invention, will be described.

Because the flat cable 22 put in the cable receiving annular space 1017 comprises two parts which are rolled in the opposite directions, the entire length of the flat cable 22 can be effectively used.

Due to provision of the rotatable annular guide body 1014 by which the flat cable 22 is divided into the inner and outer parts, the flat cable 22 can smoothly move in the cable receiving annular space 1017.

Because the annular guide body 1014 is rotatably supported by the rotor 1012, it is possible to provide a certain space between the lower edges of the inner and outer cylindrical walls 1071 and 1072 and the circular lower wall 1031 of the annular casing 1016. This induces a smoothed rotation of the annular guide body 1014 relative to the rotor 1012.

Due to provision of the ridges 1075 and 1076 on the inner and outer cylindrical walls 1071 and 1072 of the annular guide body 1014, the friction between the flat cable 22 and each of the walls 1071 and 1072 can be reduced. This promotes the smoothed movement of the flat cable 22 in the cable receiving annular space 1017.

Figure 12:
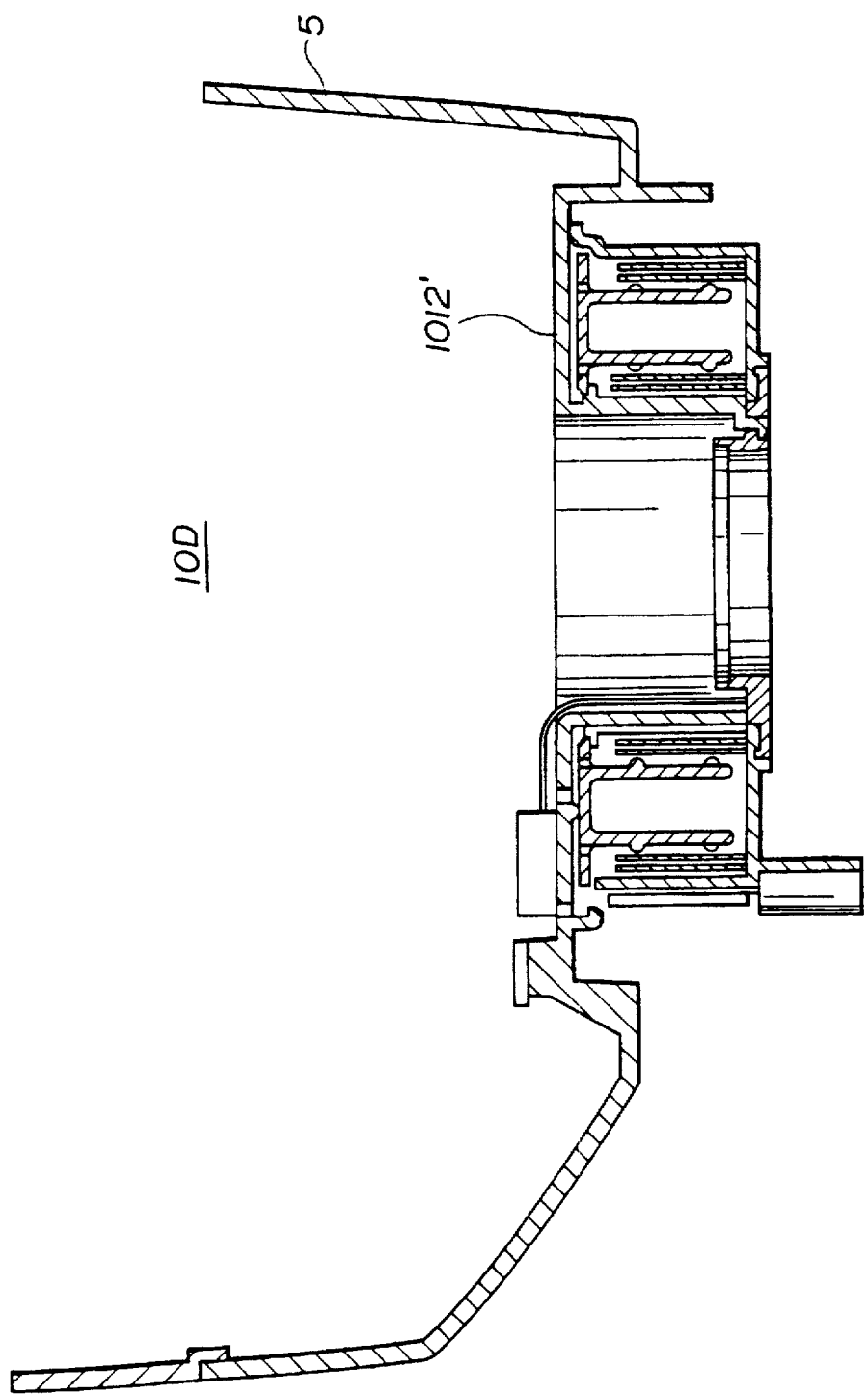
FIG. 12 is a sectional view of a cable type electric connector which is a fourth embodiment of the present invention.

Referring to FIG. 12, there is shown a cable type electric connector 10D which is a fourth embodiment of the present invention.

The connector 10D of this fourth embodiment is substantially the same as that of the above-mentioned third embodiment except that in the fourth embodiment, the rotor 1012' is integrally molded with the lower cover 5 of the steering wheel 2.

Figure 13:
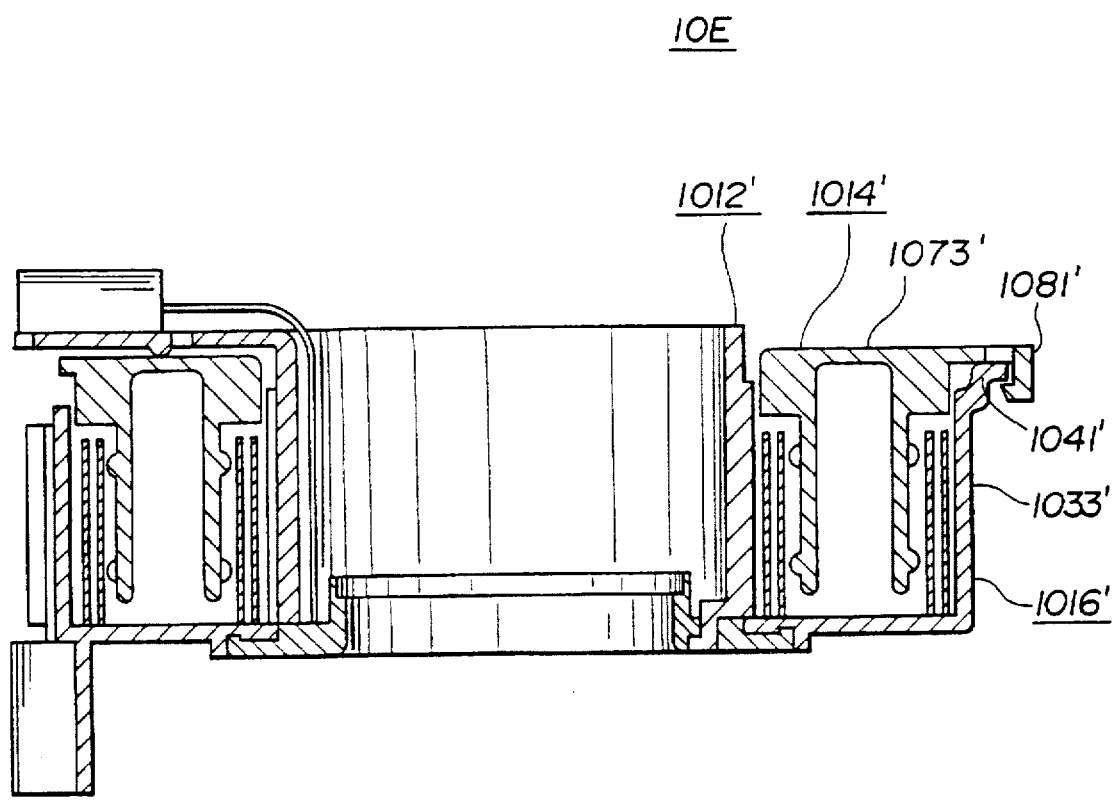
FIG. 13 is a sectional view of a cable type electric connector which is a fifth embodiment of the present invention.

Referring to FIG. 13, there is shown a cable type electric connector 10E which is a fifth embodiment of the present invention.

The connector 10E of this fifth embodiment is substantially the same as that of the above-mentioned third embodiment except that in the fifth embodiment, the annular guide body 1014' is rotatably supported by the annular casing 1016'. That is, the circular upper wall 1073' of the annular guide body 1014' has a larger outer flange 1081' which is slidably put on the flange 1041' of the cylindrical wall 1033' of the annular casing 1016'. That is, in this embodiment, the annular guide body 1014' is not supported by the rotor 1012'.

Figure 14:
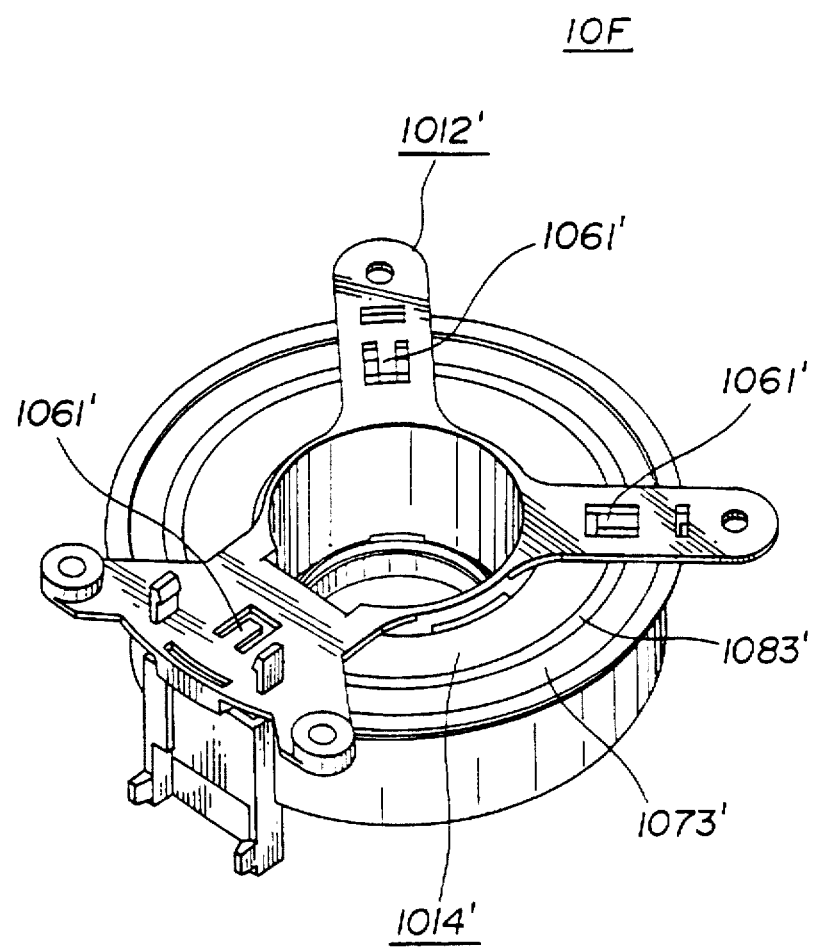
FIG. 14 is a perspective view of a cable type electric connector in an assembled condition, which is a sixth embodiment of the present invention.
Figure 15:
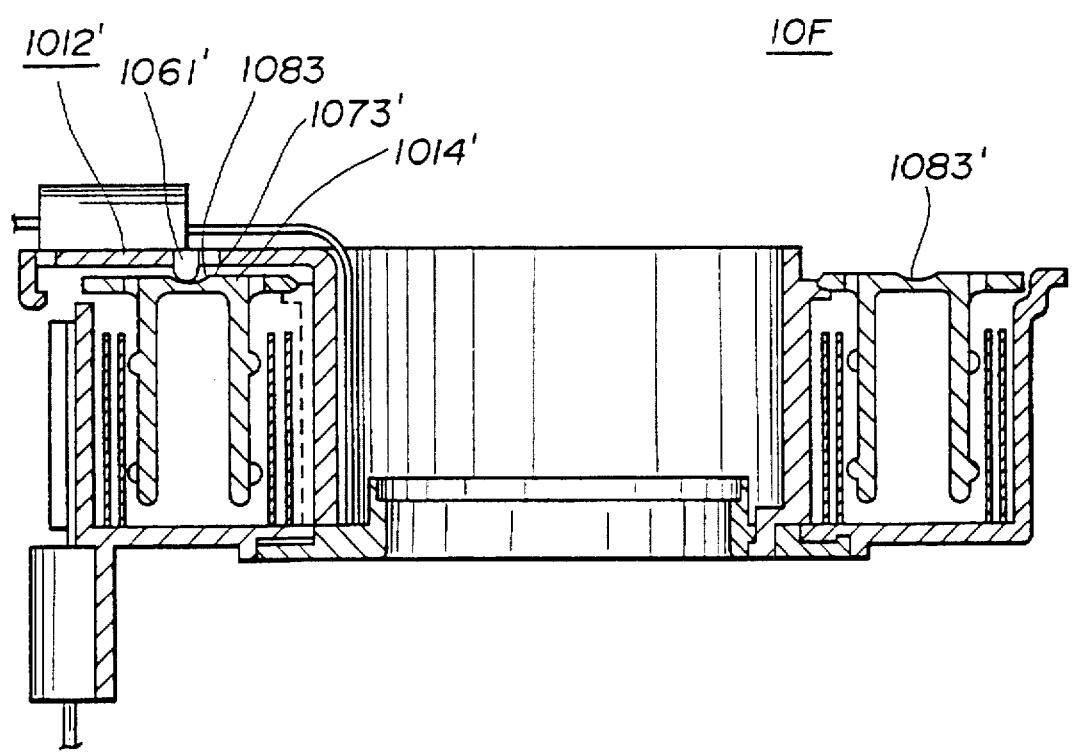
FIG. 15 is a sectional view of the connector of the sixth embodiment.

Referring to FIGS. 14 and 15, there is shown a cable type electric connector 10F which is a sixth embodiment of the present invention.

The connector 10F of this embodiment is substantially the same as that of the third embodiment 10C except that in the sixth embodiment, the three tongue-shaped projections 1061' of the rotor 1012' are slidably pressed against and engaged with an annular groove 1083' formed on the circular upper wall 1073' of the annular guide body 1014'.

What is claimed is:

1. A cable type electric connector comprising:

an annular casing having an inner cylindrical wall;

an annular rotor having a concentric collar portion coaxially and rotatably received in said annular casing to define therebetween a cable receiving annular space;

an annular guide body concentrically and rotatably received in said cable receiving annular space to provide both an inner annular space defined between the collar portion of said annular rotor and an inner cylindrical wall of said annular guide body and an outer annular space defined between the inner cylindrical wall of said annular casing and an outer cylindrical wall of said annular guide body, said annular guide body having therein a cable passing slot through which said inner and outer annular spaces are connected;

a flat cable passing through the cable passing slot of said annular guide body and having an inner end connected to the collar portion of said annular rotor and an outer end connected to said annular casing, so that when said annular rotor and said annular casing make a relative rotation therebetween, said flat cable is forced to make a roll wound in one direction in said inner annular space or a roll wound in the other direction in said outer annular space;

means for combining said annular casing, said annular guide body and said annular rotor in such a manner as to permit mutual rotation therebetween; and means for defining in one axial end of said inner annular space an annular groove into which a first longitudinally extending side edge of said flat cable is slidably inserted, said annular groove being concentric with said annular rotor.

2. A cable type electric connector as claimed in claim 1, in which said annular casing is formed with an annular bottom portion having an upper surface to which said first longitudinally extending side edge of said flat cable in said cable passing slot slidably contacts, and in which the upper surface of said annular bottom portion is higher than a depth of said annular groove.

3. A cable type electric connector as claimed in claim 2, in which the upper surface of said annular bottom portion is convex in shape.

4. A cable type electric connector as claimed in claim 3, in which said annular groove is defined by an annular cable holder ring which is detachably and concentrically connected to said annular rotor.

5. A cable type electric connector as claimed in claim 3, in which said annular groove is defined by the concentric collar portion of said annular rotor.

6. A cable type electric connector as claimed in claim 3, further comprising means for defining in said inner annular space an inner annular guide track onto which a second longitudinally extending side edge of said flat cable slidably contacts, said inner annular guide track facing said annular groove and having a sloped portion extending circumferentially therealong.

7. A cable type electric connector as claimed in claim 6, in which said inner annular guide track further has a flat portion which occupies the remaining part of said annular guide track.

8. A cable type electric connector as claimed in claim 6, in which said inner annular guide track is sloped throughout the entire length thereof.

9. A cable type electric connector as claimed in claim 6, in which said inner annular guide track is provided by said annular guide body, and in which said sloped portion of said inner annular guide track has the highest part in the vicinity of said cable passing slot of said annular guide body.

10. A cable type electric connector as claimed in claim 6, further comprising means for defining in said outer annular space an outer annular guide track onto which the second longitudinally extending side edge of said flat cable slidably contacts, said outer annular guide track having a sloped portion extending circumferentially therealong.

11. A cable type electric connector as claimed in claim 10, in which said outer annular guide track is provided by said annular guide body, and in which said sloped portion of the outer annular guide track has the highest part in the vicinity of said cable passing slot of said annular guide body.

12. A cable type electric connector as claimed in claim 11, further comprising means for defining in said outer annular space another annular groove into which the first longitudinally extending side edge of said flat cable is slidably inserted, said another annular groove facing said outer annular guide track.

13. A cable type electric connector as claimed in claim 12, in which said another annular groove is provided by said annular casing.

* * * * *